United States Patent [19]

Barbarin et al.

[11] Patent Number: 4,922,713

[45] Date of Patent: May 8, 1990

[54] TURBOJET ENGINE THRUST REVERSER WITH VARIABLE EXHAUST CROSS-SECTION

[75] Inventors: Jacques M. G. Barbarin, Montivilliers; Pascal B. G. Lecoutre, Le Havre, both of France

[73] Assignee: Societe Anonyme Dite Hispano-Suiza, Saint-Cloud, France

[21] Appl. No.: 267,344

[22] Filed: Nov. 4, 1988

[30] Foreign Application Priority Data

Nov. 5, 1987 [FR] France ............................ 87 15336

[51] Int. Cl.⁵ .............................................. F02K 1/64
[52] U.S. Cl. ..................................... 60/226.2; 60/242; 239/265.31
[58] Field of Search ................ 60/226.2, 229, 230, 60/242; 239/265.31, 265.29, 265.27, 265.19; 244/110 B, 12.5

[56] References Cited

U.S. PATENT DOCUMENTS

| | | | |
|---|---|---|---|
| 3,500,645 | 3/1970 | Hom | 60/229 |
| 3,779,010 | 12/1973 | Chamay et al. | 60/226.2 |
| 3,820,719 | 6/1974 | Clark | 239/265.31 |
| 4,442,987 | 4/1984 | Legrand et al. | 244/110 B |
| 4,731,991 | 3/1988 | Newton | 60/226.2 |
| 4,793,134 | 12/1988 | Coplin et al. | 60/226.2 |

FOREIGN PATENT DOCUMENTS 0109219 5/1984 European Pat. Off. .
1116779 6/1968 United Kingdom .

Primary Examiner—Donald E. Stout
Attorney, Agent, or Firm—Bacon & Thomas

[57] ABSTRACT

A trust reverser is disclosed for a turbofan-type turbojet engine having the capabilities of reversing the air passing through a cold flow air duct to provide a reverse thrust for the engine and also adjusting the cross-section of the cold flow air duct. This enables the cold flow air duct to be increased in cross section during periods of high thrust operation, a cowl defining the outer limits of the cold flow air duct has a stationary portion arranged generally, concentrically about the hot gas exhaust duct, and two movable portions, each of which are movable axially with respect to the stationary cowl. Locking systems are utilized to releasably lock a first movable cowl to the stationary cowl, and to releasably lock the second movable cowl to the first movable cowl.

10 Claims, 3 Drawing Sheets

TURBOJET ENGINE THRUST REVERSER WITH VARIABLE EXHAUST CROSS-SECTION

BACKGROUND OF THE INVENTION

The present invention relates to a thrust reverser for a turbofan-type turbojet engine having the capabilities of also varying the exhaust cross-section of the cold flow air duct.

In turbofan-type turbojet engines, a cowling is disposed generally concentrically about the hot gas exhaust duct of the turbojet engine so as to define a cold flow air duct therebetween. The cold flow air duct directs air from a turbofan driven by the engine in a direction generally parallel to the longitudinal axis of the engine, so as to augment the thrust of the turbojet engine.

In such engines having a sufficiently high by-pass ratio, it is known to provide a thrust reversing device which acts only on the air passing through the cold flow air duct. The thrust reverser may comprise movable cowl portions adapted to be axially movable along the longitudinal axis of the turbojet engine so as to cover and uncover thrust reversing deflection vanes mounted on a stationary portion of the cowl. Flaps are typically present on the interior surface of the movable cowl portions so as to block the cold flow air duct and to direct the air generally laterally outwardly through the deflection vanes to provide the requisite thrust reversing force. Typically, the movable cowl portions are axially moved in a downstream direction to uncover the deflection vanes.

Generally the movable cowl portions comprise semi-cylindrical portions located on either side of an axial plane passing through the longitudinal axis of the engine and are provided with actuators to move them in their axial directions. Link rods may be connected between the flaps and a stationary portion of the engine structure such that axial movement of the cowl portions also causes the flaps to assume their blocking positions. Typical examples of such thrust reversers can be found in U.S. Pat. No. 3,500,645 to Hom and European Patent Application Ser. No. 0 109 219.

The known thrust reverser designs have proven generally successful, especially when the turbojet engine is operating in the forward thrust mode under steady state, cruising conditions. The movable cowl portions in combination with the stationary cowl provide substantially continuous, aerodynamic internal and external cowl surfaces so as to provide efficient air flow in the cold flow air duct and over the external surface of the cowl.

The known thrust reversing systems do not have the capabilities of adjusting the cross section of the cold flow air duct. This presents a problem during full power operation of the turbojet engine, such as during aircraft take-off or climbing, when it would be advantageous to provide a greater exhaust cross-sectional area for the cold flow air duct to achieve the full thrust augmentation benefits of the turbofan.

SUMMARY OF THE INVENTION

The present invention provides a thrust reverser for a turbofan-type turbojet engine having the capability of not only reversing the air passing through the cold flow air duct to provide a reversed thrust for the engine, but also having the capability of adjusting the cross-section of the cold flow air duct. This enables the cold flow air duct to be increased in cross-section during periods of high thrust operation of the turbojet engine to achieve the full benefits of the turbofan thrust.

The cowl defining the outer limits of the cold flow air duct has a stationary portion arranged generally concentrically about the hot gas exhaust duct, and two movable portions, each of which are movable axially with respect to the stationary cowl. Locking systems are utilized to releasably lock a first movable cowl to the stationary cowl, and to releasably lock the second movable cowl to the first movable cowl.

Flaps are attached to the interior of the first movable cowl and are connected to a stationary portion of the turbojet engine by one or more link rods. The flaps are movable between a retracted position, wherein they allow unimpeded air flow through the cold flow air duct, and a blocking position, wherein the air flow through the duct is blocked by the flaps.

During normal, cruising operation of the turbojet engine, the first and second movable cowls are locked to each other and to the stationary cowl, and the flaps are in their retracted positions to provide an aerodynamically smooth surface on both the exterior and the interior of the cowl.

In order for the device to be operated in the thrust reversing mode, the locks interlocking the first movable cowl with the second movable cowl are released, and actuators are activated so as to move both the first and second cowls as a unit in a direction generally parallel to the longitudinal axis of the engine. This axial translational movement uncovers deflection vanes and, at the same time, moves the flaps into their blocking positions such that all of the air in the cold flow air duct passes generally, laterally outwardly through the deflection vanes to provide the reversed thrust force.

During high thrust operating modes of the turbojet engine, the second movable cowl is unlocked from the first movable cowl which remains locked to the stationary cowl to cover the deflection vanes and to retain the blocking flaps in their retracted positions. The actuators then move only the second movable cowl axially away from the first movable cowl to provide an additional outlet area for the cold flow air duct. This additional exhaust area enables the turbofan to produce its optimal thrust augmentation.

DETAILED DESCRIPTION OF THE PREFERRED EMBODIMENT

Figure 1:
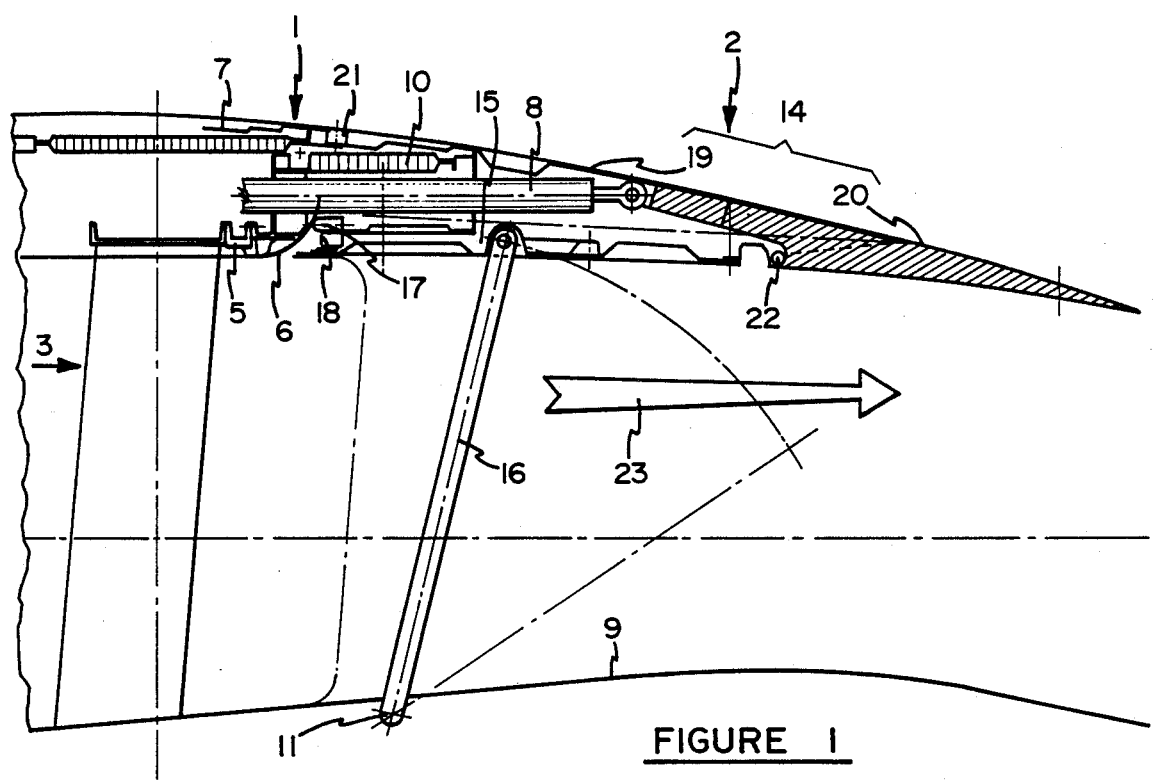
FIG. 1 is a partial, longitudinal cross-sectional view of a cowl incorporating the thrust reverser of the invention showing the thrust reverser in the forward thrust cruising mode.
Figure 1A:
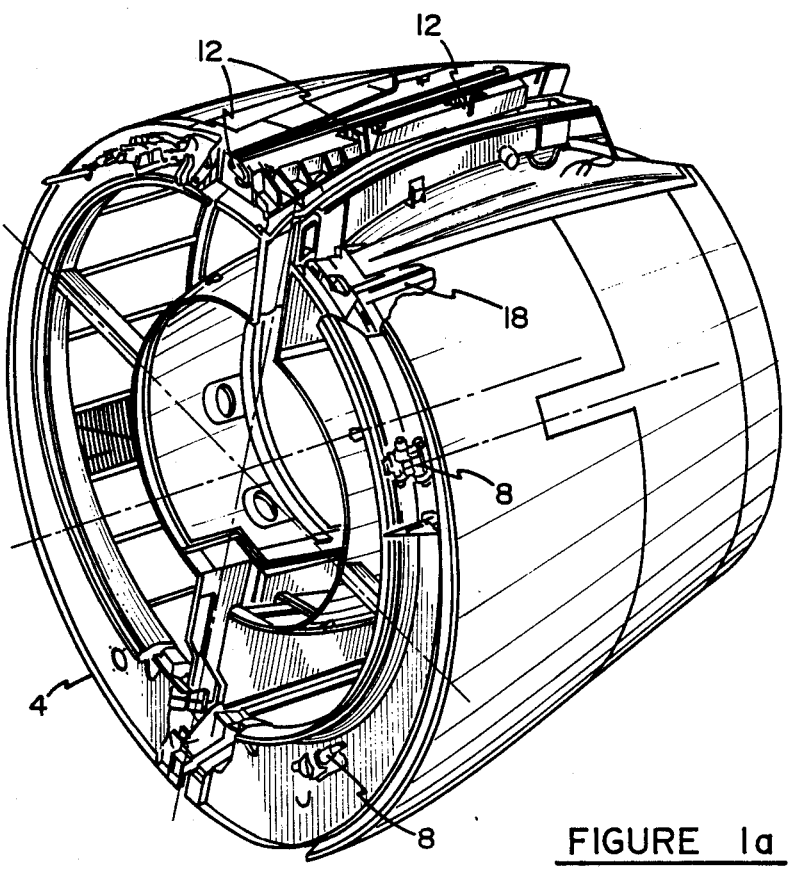
FIG. 1a is a partial, perspective front view, partially broken away, illustrating the thrust reverser of FIG. 1.

The thrust reverser according to the invention, as illustrated in FIGS. 1 and 1a, comprises a stationary cowl 1 having a movable cowl structure 2 attached to the downstream end thereof so as to be movable in a generally axial direction. The stationary cowl 1 includes a forward, upstream frame 3 including annular portion 4 which links it to the turbojet engine structure (not shown). The forward frame 3 also includes an inner peripheral collar 5 forming a deflection edge 6 and an outer collar 7. The external surface of outer collar 7 forms the outer surface of the stationary cowl 1 which matches that of the upstream duct portion, so as to provide an aerodynamically smooth exterior surface.

The cowl 1 is generally concentrically attached about a hot gas exhaust duct 9 which serves to exhaust the hot gases emanating from the turbojet engine. The exhaust gas duct 9 defines an inner boundary, while the inner surface of cowl 1 defines an outer boundary of a cold flow air duct which directs air from an upstream direction to a downstream direction, as indicated by arrow 23. This duct communicates with a turbofan (not shown) driven by the turbojet engine.

Stationary cowl 1 also includes deflection vanes 10. Deflection vanes 10 serve to direct air passing laterally, outwardly therethrough in a generally forward direction to provide the requisite reverse thrust. The deflection vanes 10 extend around the stationary cowl 1 in an annular array and comprise vanes having contours to guide the air flow so as to obtain the optimal thrust reversal.

The stationary cowl 1 movably supports the thrust reverser 2 in a manner known, per se, comprising guides 12 slidably engaging slides 13. The support structure is present at the top and bottom portions of the semi-cylindrical moving cowls. The semi-cylindrical moving cowls 14 are arranged about the hot gas exhaust gas 9 so as to define a continuation of the cold flow air duct therebetween. Each of the movable cowls 14 is movable in an axial direction with respect to both the stationary cowl 1 and the hot gas exhaust duct 9. A guidance device, as shown in U.S. Pat. No. 4,442,987 to Legrand et al, may be utilized to axially movably support the movable cowls 14 on the stationary cowl 1.

Each of the semi-cylindrical cowls 14 comprise a first movable cowl 19 and a second movable cowl 20. Each of the semi-cylindrical cowls 14 has a rail 18 that slidably cooperates with the slide 13 located on the stationary cowl 1 in known fashion.

Movable flaps 15 are pivotally connected to the upstream, first movable cowl 19 by pivot hinge 17. Link rod 16 has one end pivotally attached to hot gas exhaust duct 9 and the other end pivotally attached to flap 15. The geometry of this interconnection is such that the flaps 15 are movable between a retracted position, shown in FIG. 1, wherein they are substantially flush with the interior surface of the cowl, and blocking positions wherein the flaps block the air flowing through the cold flow air duct.

A first lock means 21 serves to releasably lock the first movable cowl 19 to the stationary cowl 1. Second lock means 22 serves to releasably interlock the second, downstream movable cowl 20 to the first movable cowl 19. The precise structures of the first and second locking means, per se, form no part of the present invention in any known, releasable locking means (such as hook or pawl locks) may be utilized without exceeding the scope of this invention. Hydraulic, pneumatic or electrical means may be utilized to lock and unlock the first and second lock devices in known fashion.

During the normal forward thrust, cruise operating mode, the first movable cowl 19 is locked to the stationary cowl 1 and second movable cowl 20 is locked to movable cowl 19, as illustrated in FIG. 1. When these elements are in these positions, the movable flaps 15 bear against the inner surface of the first movable cowl 19 so as to provide a substantially smooth aerodynamic surface for the air passing through the cold flow air duct in the direction of arrow 23. The inner surfaces of stationary cowl 1, flaps 15 and the inner surface of second movable cowl 20 form a substantially continuous aerodynamic boundary for the cold air flow. Similarly, the exterior surfaces of the stationary cowl and the first and second movable cowls also form a substantially continuous aerodynamic boundary for the air passing over the exterior of the cowl.

Figure 2:
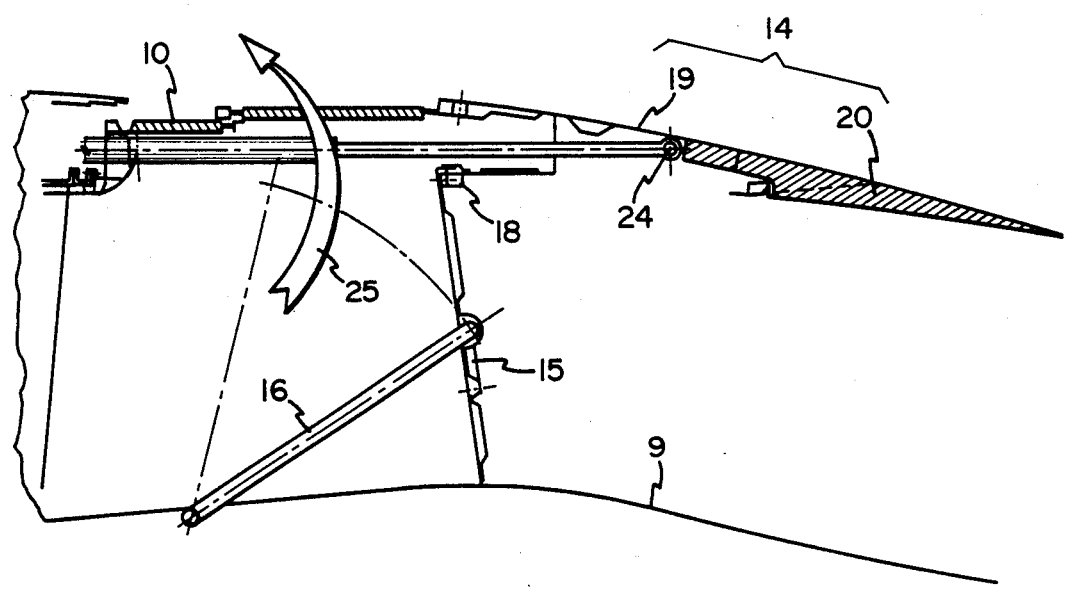
FIG. 2 is a partial, longitudinal cross-sectional view of the cowl of FIG. 1, showing the thrust reverser in the reversed thrust mode.
Figure 2A:
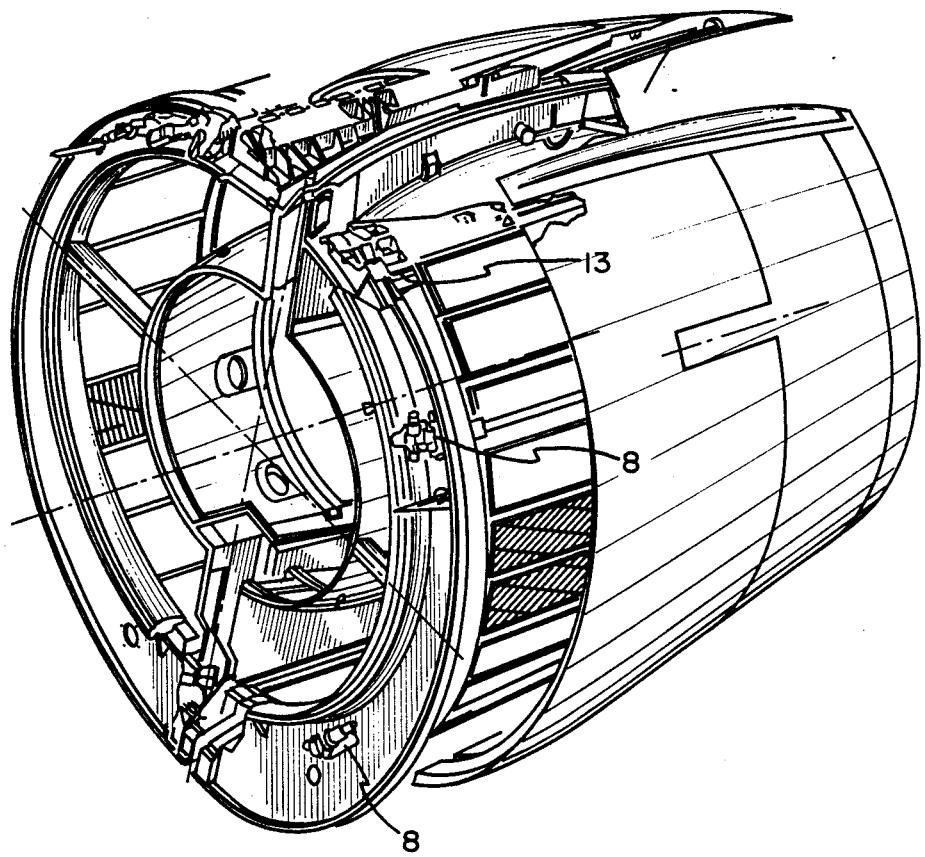
FIG. 2a is a partial perspective front view, partially broken away, of the thrust reverser in the position shown in FIG. 2.

The thrust reversing position of the respective elements are shown in FIGS. 2 and 2a. The first locking device 21 is released, and the first and second movable cowls 19 and 20 are moved axially downstream as a unit by actuating cylinder 8. Actuating cylinder 8, which may be a hydraulic jack or the like, has one end attached to stationary cowl 1, and an extendable and retractable rod connected to second movable cowl 20 at 24. The axial movement of the first movable cowl 19 with respect to the hot gas exhaust duct 9 causes flaps 15 to pivot about their attachments 17 and assume their blocking positions so as to completely block the air flowing through the cold flow air duct. This axial movement also serves to uncover deflection vanes 10. Thus, the air is directed laterally outwardly through the deflection vanes 10 in the direction of arrow 25 in FIG. 2, so as to provide the requisite reverse thrust.

Figure 3:
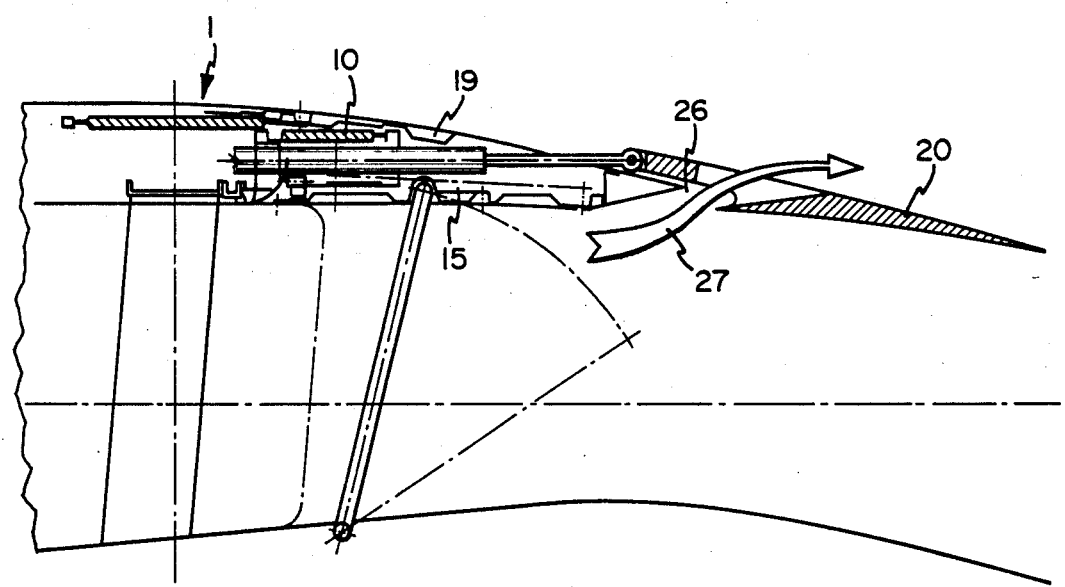
FIG. 3 is a partial, longitudinal cross-sectional view of the thrust reverser according to the invention, illustrating the thrust reverser in the maximum forward thrust position.
Figure 3A:
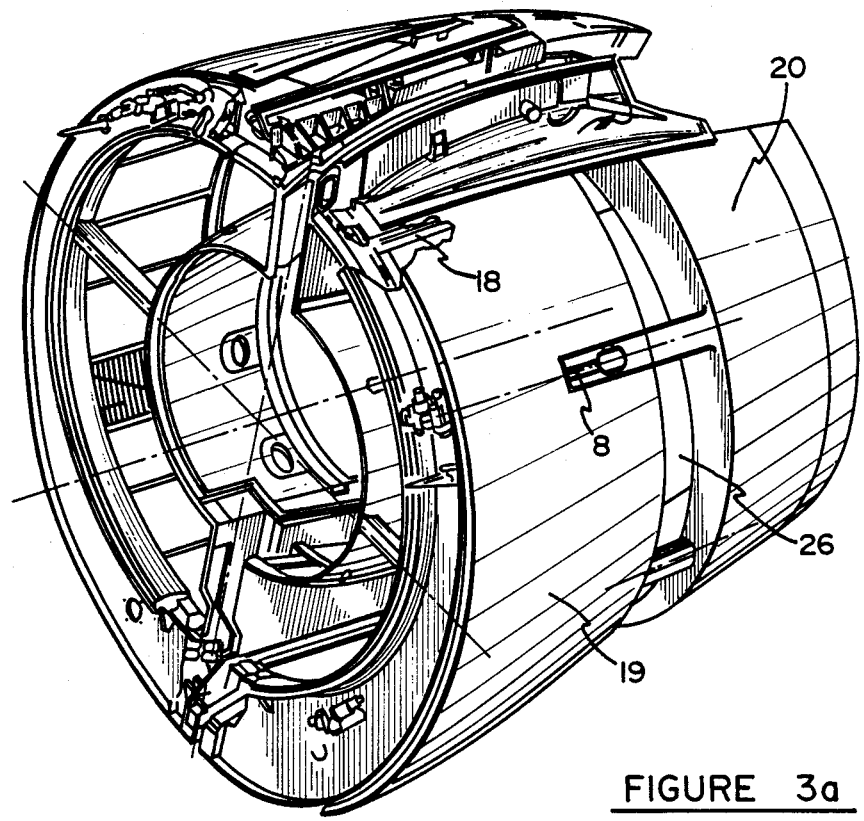
FIG. 3a is a partial perspective front view, partially broken away, of the thrust reverser shown in FIG. 3.

In those instances where maximum engine thrust is required, the locking device 21 is retained in its locked position, thereby locking first movable cowl 19 to stationary cowl 1. This retains the movable cowl 19 in a position wherein it covers the deflection vanes 10 and retains the movable flaps 15 in their retracted positions. The locking means 22 is disengaged and the actuator 8 is activated, thereby axially moving the second movable cowl 20 in a downstream direction away from the first movable cowl 19, as illustrated in FIGS. 3 and 3a. This clears a passageway 26 between the first and second movable cowls to increase the exhaust cross-sectional area of the cold flow air duct. A portion of the cold flow air passes through opening 26 in the direction of arrow 27, as illustrated in FIG. 3. Thus, the cross section of the air duct is increased to match the increased thrust requirements of the engine to optimize the efficiency, the specific fuel consumption and improving the performance of the turbojet engine.

The foregoing description is provided for illustrative purposes only, and should not be construed as in any way limiting this invention, the scope of which is defined solely by the appended claims.

What is claimed is:

1. A thrust reverser for a turbofan-type turbojet engine having a hot gas exhaust duct comprising:
   (a) a stationary cowl arranged generally concentrically about the hot gas exhaust duct so as to define a generally annular cold flow air duct therebetween;
   (b) deflection vanes attached to the stationary cowl;

(c) a first movable cowl slidably attached to the stationary cowl so as to be movable in a generally axial direction;

(d) a second movable cowl slidably attached to the stationary cowl so as to be movable in a generally axial direction;

(e) flap means movable between a blocking position and a retracted position;

(f) first locking means to releasably lock the first movable cowl to the stationary cowl;

(g) second locking means to releasably lock the second movable cowl to the first movable cowl; and, (h) actuating means operatively interposed between the stationary cowl and the second movable cowl to move the first and second movable cowls with respect to the stationary cowl between: a first position wherein the first movable cowl is locked to the stationary cowl thereby covering the deflection vanes and the second movable cowl is locked to the first movable cowl; a second position wherein the first and second movable cowls are moved axially as a unit to thereby uncover the deflection vanes; and a third position wherein the second movable cowl is axially displaced from the first movable cowl which is locked to the stationary cowl covering the deflection vanes so as to increase the exit area of the cold flow air duct.

2. The thrust reverser according to claim 1 further comprising:

(a) pivot means to pivotally attach the flap means to the first movable cowl; and, (b) link means interconnecting the flap means and the hot gas exhaust duct such that as the first movable cowl is moved from the first position to the second position, the flap means are moved from their retracted positions to their blocking positions.

3. The thrust reverser according to claim 1 wherein the actuating means comprises jack means having a stationary portion attached to the stationary cowl, and an extendible and retractable portion attached only to the second movable cowl.

4. The thrust reverser according to claim 3 where the first movable cowl is axially located between the stationary cowl and the second movable cowl.

5. The thrust reverser according to claim 4 further comprising at least one passageway defined by the second movable cowl and located such that the passageway communicates with the cold flow air duct only when the second movable cowl is displaced axially away from the first movable cowl.

6. A thrust reverser for a turbofan-type turbojet engine having a hot gas exhaust duct comprising:

(a) a stationary cowl arranged generally concentrically about the hot gas exhaust duct so as to define a generally annular cold flow air duct therebetween;

(b) deflection vanes attached to the stationary cowl;

(c) a first movable cowl slidably attached to the stationary cowl so as to be movable in a generally axial direction;

(d) a second movable cowl slidably attached to the stationary cowl so as to be movable in a generally axial direction;

(e) actuating means operatively interposed between the stationary cowl and the second movable cowl to move the first and second movable cowls with respect to the stationary cowl between: a first position wherein the first movable cowl is axially adjacent to the stationary cowl and the second movable cowl is axially adjacent to the first movable cowl to provide aerodynamically smooth exterior and interior surfaces; a second position wherein the first and second movable cowls are displaced axially as a unit away from the stationary cowl to thereby uncover the deflection vanes; and a third position wherein the second movable cowl is axially displaced from the first movable cowl which is axially adjacent to the stationary cowl to increase the exit area of the cold flow air duct;

(f) flap means pivotally attached to the first movable cowl so as to be movable between a retracted position wherein the cold flow air duct is open and the flap means covers the deflection vanes to prevent air flow therethrough, and a blocking position wherein the deflection vanes are uncovered and the cold flow air duct is blocked to direct cold flow air through the deflection vanes; and, (g) flap activating means operatively connected to the flap means such that the flap means are moved from the retracted position to the blocking position only when the first movable cowl is displaced away from the stationary cowl.

7. The thrust reverser according to claim 6 wherein the actuating means comprises jack means having a stationary portion attached to the stationary cowl, and an extendible and retractable portion attached only to the second movable cowl.

8. The thrust reverser according to claim 7 wherein the flap activating means comprises:

(a) link rod means having first and second ends;

(b) first pivot means pivotally connecting the first end of the link rod to the flap means; and, (c) second pivot means pivotally connecting the second end of the link rod to the hot gas exhaust duct.

9. The thrust reverser according to claim 7 wherein the first movable cowl is axially located between the stationary cowl and the second movable cowl.

10. The thrust reverser according to claim 6 further comprising at least one passageway defined by the second movable cowl and located such that the passageway communicates with the cold flow air duct only when the second movable cowl is displaced axially away from the first movable cowl.

* * * * *